US010863050B2

(12) United States Patent
Shiraishi

(10) Patent No.: US 10,863,050 B2
(45) Date of Patent: Dec. 8, 2020

(54) OPTICAL DEVICE USING LENS MIRROR ARRAY AND IMAGE FORMING APPARATUS

(71) Applicant: TOSHIBA TEC KABUSHIKI KAISHA, Tokyo (JP)

(72) Inventor: Takashi Shiraishi, Kawasaki Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/538,007

(22) Filed: Aug. 12, 2019

(65) Prior Publication Data
US 2020/0106911 A1 Apr. 2, 2020

(30) Foreign Application Priority Data

Oct. 2, 2018 (JP) ................................ 2018-187414

(51) Int. Cl.
*H04N 1/04* (2006.01)
*H04N 1/028* (2006.01)
*G03G 15/22* (2006.01)
*H04N 1/032* (2006.01)

(52) U.S. Cl.
CPC ......... *H04N 1/02825* (2013.01); *G03G 15/22* (2013.01); *H04N 1/032* (2013.01)

(58) Field of Classification Search
CPC ..... H04N 1/02825; H04N 1/032; G03G 15/22
USPC .......... 358/482, 483, 1.8, 1.4; 347/241, 244, 347/256, 258
See application file for complete search history.

(56) References Cited

U.S. PATENT DOCUMENTS

| | | | | |
|---|---|---|---|---|
| 4,533,228 A | * | 8/1985 | Nishikawa | G03B 27/527 355/1 |
| 9,377,609 B2 | * | 6/2016 | Shiraishi | G02B 17/08 |
| 9,977,364 B1 | * | 5/2018 | Shiraishi | G03G 15/04036 |
| 2006/0209166 A1 | * | 9/2006 | Suzuki | B41J 2/473 347/231 |
| 2008/0024587 A1 | * | 1/2008 | Nomura | G03G 15/04045 347/237 |
| 2013/0100506 A1 | * | 4/2013 | Shiraishi | G02B 3/0031 358/475 |
| 2013/0100514 A1 | * | 4/2013 | Shiraishi | G02B 26/0875 359/201.1 |
| 2013/0314754 A1 | * | 11/2013 | Shiraishi | H04N 1/0311 358/475 |
| 2014/0204430 A1 | * | 7/2014 | Shiraishi | H04N 1/02825 358/474 |

(Continued)

*Primary Examiner* — Cheukfan Lee
(74) *Attorney, Agent, or Firm* — Foley & Lardner LLP

(57) ABSTRACT

An optical device includes a light emitting surface, a lens mirror array having an incident surface that transmits light from the light emitting surface and converges the light, an emission surface that emits the light incident through the incident surface, and a plurality of reflecting surfaces that reflect the light incident through the incident surface toward the emission surface, and an image plane where an image of the light emitted through the emission surface is formed. The light emitting surface and the image plane are disposed nonparallel to each other so that an imaginary first plane parallel to the light emitting surface and an imaginary second plane parallel to the image plane intersect at a side of the plurality of reflecting surfaces.

20 Claims, 8 Drawing Sheets

(56) References Cited

U.S. PATENT DOCUMENTS

| | | | |
|---|---|---|---|
| 2016/0033914 A1* | 2/2016 | Momma | H01L 27/14625 399/33 |
| 2016/0216634 A1* | 7/2016 | Shiraishi | G02B 17/002 |
| 2016/0216635 A1* | 7/2016 | Shiraishi | G03G 15/0409 |
| 2017/0351194 A1* | 12/2017 | Shiraishi | G03G 15/0409 |
| 2018/0259756 A1* | 9/2018 | Shiraishi | G02B 3/005 |
| 2019/0052768 A1* | 2/2019 | Shiraishi | H04N 1/1039 |
| 2019/0354035 A1* | 11/2019 | Shiraishi | G02B 5/09 |
| 2020/0007707 A1* | 1/2020 | Shiraishi | H04N 1/0289 |

\* cited by examiner

FIG. 2
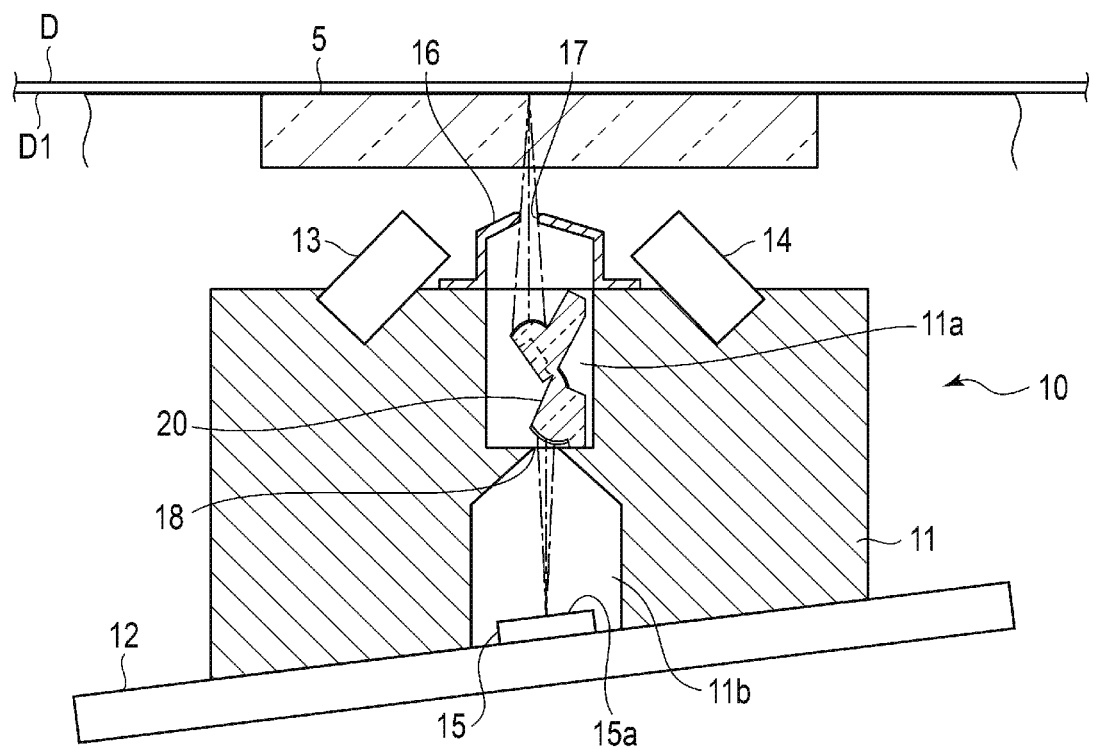
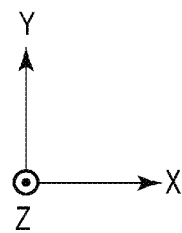

FIG. 7
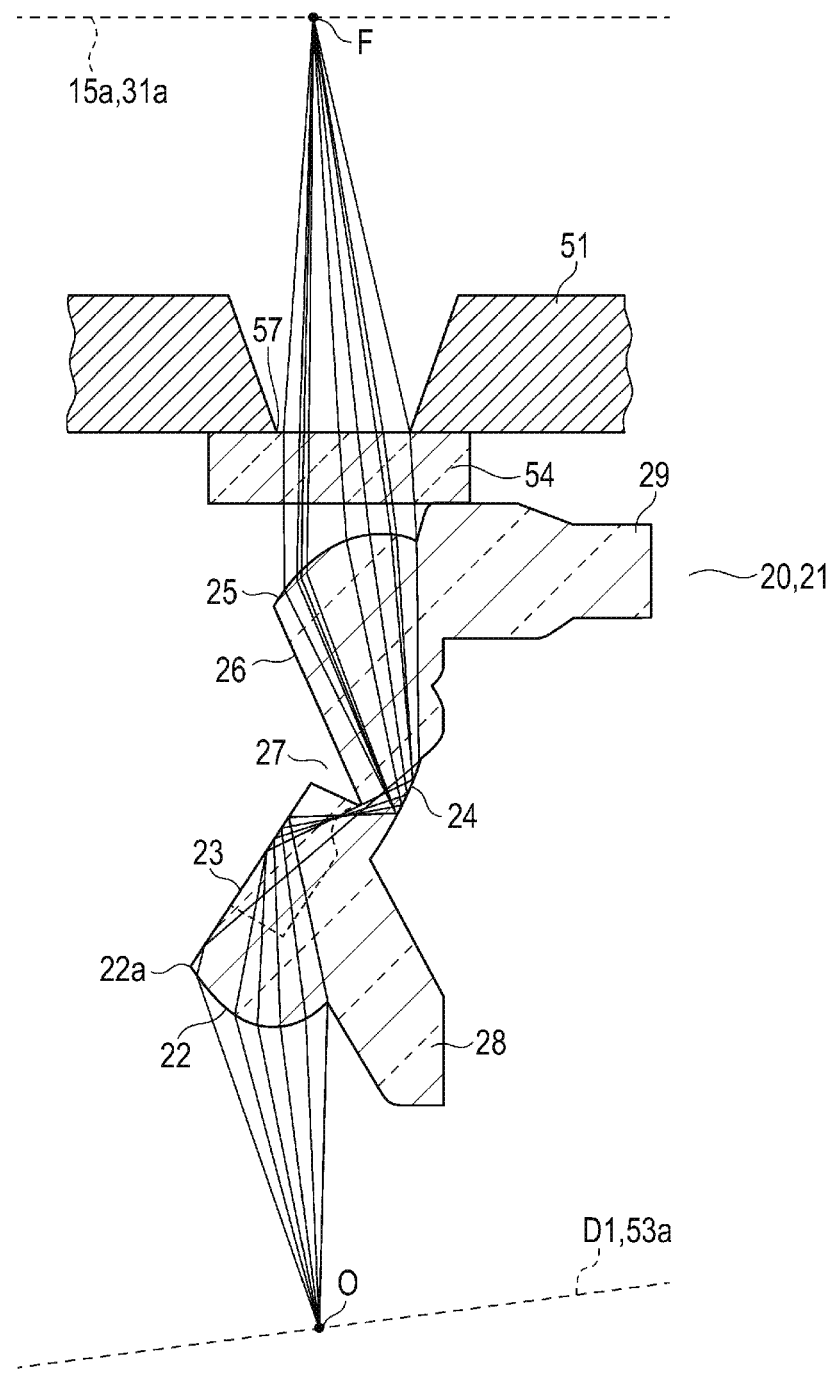
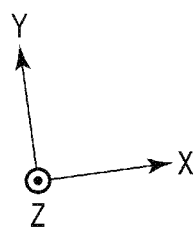

US 10,863,050 B2

OPTICAL DEVICE USING LENS MIRROR ARRAY AND IMAGE FORMING APPARATUS

CROSS-REFERENCE TO RELATED APPLICATION

This application is based upon and claims the benefit of priority from Japanese Patent Application No. 2018-187414, filed on Oct. 2, 2018, the entire contents of which are incorporated herein by reference.

FIELD

Embodiments described herein relate generally to an optical device including a lens mirror array used for, for example, a copying machine, a multifunction machine, a printer, a document reading device such as a scanner, an exposure device, and the like.

BACKGROUND

In recent years, a solid-state scanning type light emitting diode (LED) copying machine including an exposure optical system using a plurality of semiconductor LEDs in a light source is becoming widespread. The exposure device of the LED copying machine includes a light source in which a plurality of element rows, in each of which a plurality of LEDs are arranged side by side in an axial direction of a photoreceptor drum, are separately arranged side by side in a rotation direction of the photoreceptor drum. The exposure device also includes a lens mirror array that refracts and reflects light based on an image signal emitted from the plurality of LEDs of the light source and condenses the light on a surface of the photoreceptor drum.

The lens mirror array includes a plurality of optical elements arranged side by side in the axial direction of the photoreceptor drum. Respective optical elements condense light from the plurality of LEDs of the light source onto the surface of the photoreceptor drum. The lens mirror array is integrally formed of, for example, a transparent resin, and has a structure in which the plurality of optical elements are connected in the axial direction.

One optical element of the lens mirror array has an incident-side lens surface on which light from the light source is incident, and an emission-side lens surface from which light incident through the incident-side lens surface is emitted toward the surface of the photoreceptor drum. The optical element has a plurality of reflecting surfaces that reflect light incident through the incident-side lens surface toward the emission-side lens surface.

At least one of the plurality of reflecting surfaces functions as a relay lens for forming an image point conjugate to an object point on the light source side on the surface of the photoreceptor drum in cooperation with the incident-side lens surface and the emission-side lens surface. That is, each optical element has optical characteristics of forming an image of light from the light source on the surface of the photoreceptor drum.

However, since the light source of the LED copying machine described above includes the plurality of LEDs arranged side by side in the axial direction and the rotational direction of the photoreceptor drum, one optical element of the lens mirror array guides light emitted from the plurality of LEDs. For that reason, for example, if the lens mirror array is positioned and disposed so that an image of light from the LED at the center of the rotational direction of the photoreceptor drum among a plurality of LEDs facing one optical element is formed on the surface of the photoreceptor drum, strictly speaking, it is difficult to form an image of light emitted from the LEDs other than the center of the photoreceptor drum in the rotational direction on the surface of the photoreceptor drum by the same lens mirror array.

Accordingly, in order to cause light from the light source in which the plurality of LEDs are disposed to be well focused on the surface of the photoreceptor drum using the lens mirror array described above, for example, it is necessary to dispose the plurality of LEDs as densely as possible. That is, if the lens mirror array described above is used, the degree of freedom in layout of the LEDs in the light source is reduced.

From another point of view, in the lens mirror array described above, an effective width of light of which image can be formed on an image plane among light incident on the optical element through the incident-side lens surface, in a direction orthogonal to the optical axis is narrow, and does not have sufficiently satisfactory optical characteristics.

Accordingly, development of an optical device capable of expanding the effective width of incident light, of which image can be formed by the lens mirror array, in the rotational direction of the photoreceptor drum is desired.

DESCRIPTION OF THE DRAWINGS

FIG. 2 is a schematic view illustrating a document reading apparatus incorporated in the copying machine of FIG. 1;

FIG. 7 is a cross-sectional view illustrating the lens mirror array of FIG. 4 in an enlarged manner.

DETAILED DESCRIPTION

In general, according to one embodiment, an optical device includes a light emitting surface; a lens mirror array including a plurality of optical elements, each of the plurality of optical elements having an incident surface that transmits light from the light emitting surface and converges the light; an emission surface that emits light incident through the incident surface; and a plurality of reflecting surfaces that reflect the light incident through the incident surface toward the emission surface; and an image plane where an image of light emitted through the emission surface is formed. The light emitting surface and the image plane are disposed nonparallel relative to each other so that an imaginary first plane parallel to the light emitting surface and an imaginary second plane parallel to the image plane intersect at a reflecting surface side, which has a power that brings an object point on the light emitting surface and an image point on the image plane closer to a conjugate, among the plurality of reflecting surfaces.

Figure 1:
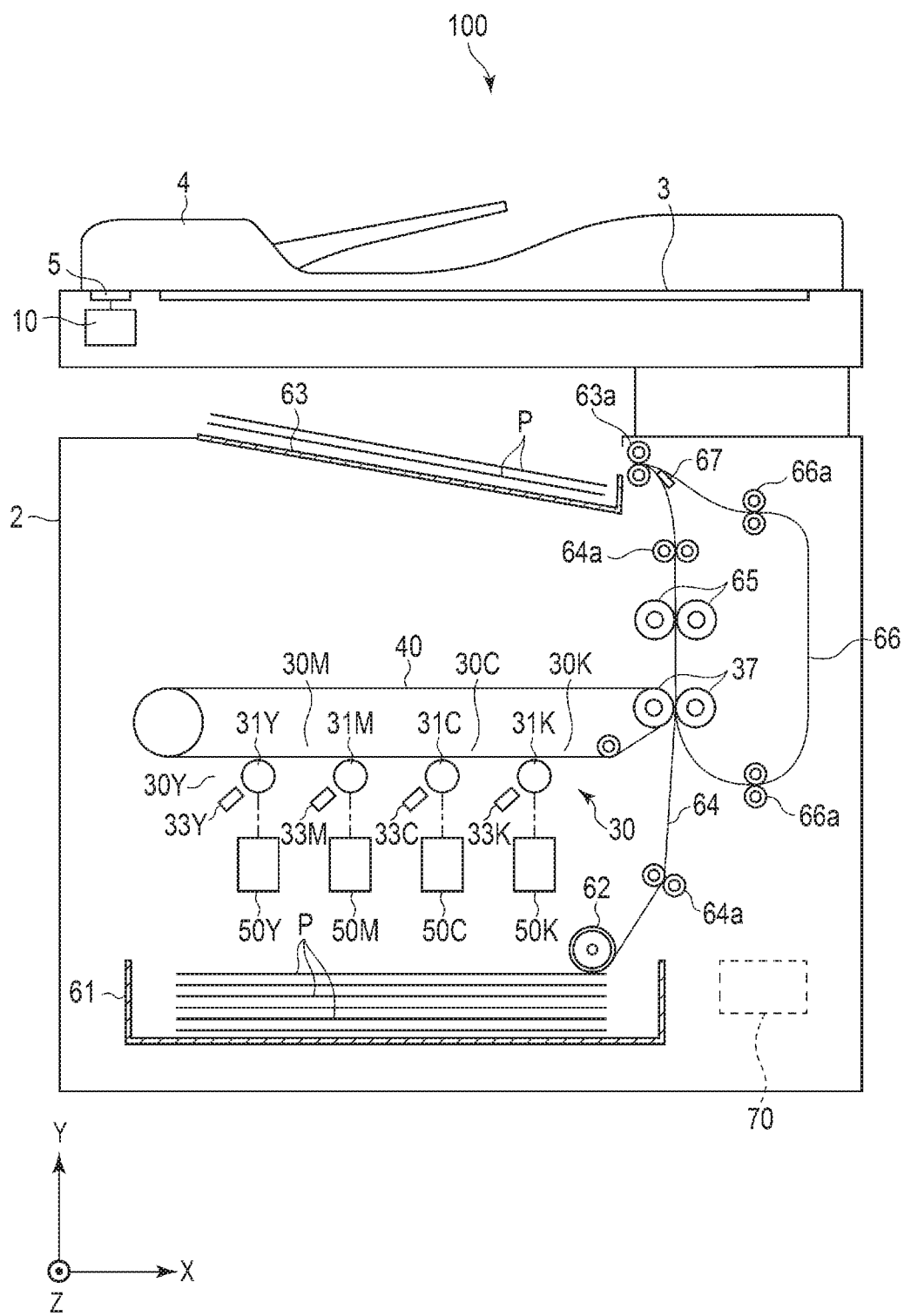
FIG. 1 is a schematic view illustrating a copying machine according to an embodiment.

Hereinafter, embodiments will be described with reference to the drawings. FIG. 1 is a schematic view illustrating a copying machine 100, which is an embodiment of an image forming apparatus. The copying machine 100 is, for example, a solid-state scanning type LED copying machine including an exposure optical system using a semiconductor light emitting element such as an LED as a light source. In the following description, the left and right direction of the copying machine 100 is taken as the X-direction, the up and down direction of the copying machine 100 is taken as the Y-direction, and the front and rear direction of the copying machine 100 is taken as the Z-direction. In each drawing, the X-direction is indicated by an arrow X, the Y-direction is indicated by an arrow Y, and the Z-direction is indicated by an arrow Z.

The copying machine 100 includes a casing 2. A transparent document table glass 3 on which a document D (see FIG. 2) is set is provided on a top surface of the casing 2. An automatic document feeder (ADF) 4 is provided on the document table glass 3. The ADF 4 is provided on the document table glass 3 so as to be openable and closable. The ADF 4 functions as a document presser for pressing a document D placed on the document table glass 3 and also has a function of feeding the document D through a document reading position (reading glass 5) described later. The document D is set in such a direction that the document surface D1 (see FIG. 2) on which an image or a character is formed faces the document table glass 3.

A document reading device 10 is provided below the document table glass 3. FIG. 2 is a schematic view illustrating the document reading device 10. The document reading device 10 is provided so as to be movable along the document table glass 3 by a drive mechanism (not illustrated) in the left and right direction (X-direction). The document reading device 10 is provided so as to be fixable below (position illustrated in FIG. 1) the transparent reading glass 5 which is provided to be flush with the document table glass 3.

As illustrated in FIG. 2, the document reading device 10 includes a substantially rectangular block-shaped support 11. The support 11 is extended in a direction (Z-direction) orthogonal to a paper surface parallel to a rotating shaft of a photoreceptor drum described later. The support 11 is disposed on a substrate 12. The substrate 12 is extended in the Z-direction orthogonal to the paper surface, and is disposed in an orientation nonparallel to the document table glass 3. The substrate 12 and the support 11 are provided so as to be movable along the document table glass 3 in the X-direction.

Two illumination devices 13 and 14 are provided on the top surface of the support 11 closer to the document table glass 3 (the reading glass 5). The illumination devices 13 and 14 extend in the Z-direction, and are provided separately from each other in the left and right direction (X-direction) in FIG. 2. The illumination devices 13 and 14 move in the X-direction together with the support 11 to illuminate a document surface D1 of the document D placed on the document table glass 3 and to illuminate the document surface D1 of the document D fed along the reading glass 5. The illumination devices 13 and 14 are attached to the support 11 in an inclined orientation in which illumination light of the illumination devices is directed to a reading area of the document D.

The illumination devices 13 and 14 each include, for example, a light source in which a plurality of LED elements (not illustrated) are arranged side by side in the Z-direction orthogonal to the paper surface, and have a light guide (not illustrated) extended in the Z-direction. The illumination devices 13 and 14 may, in addition to this, include a fluorescent tube, a xenon tube, a cold cathode ray tube, an organic EL, and the like extended in the Z-direction.

Figure 3:
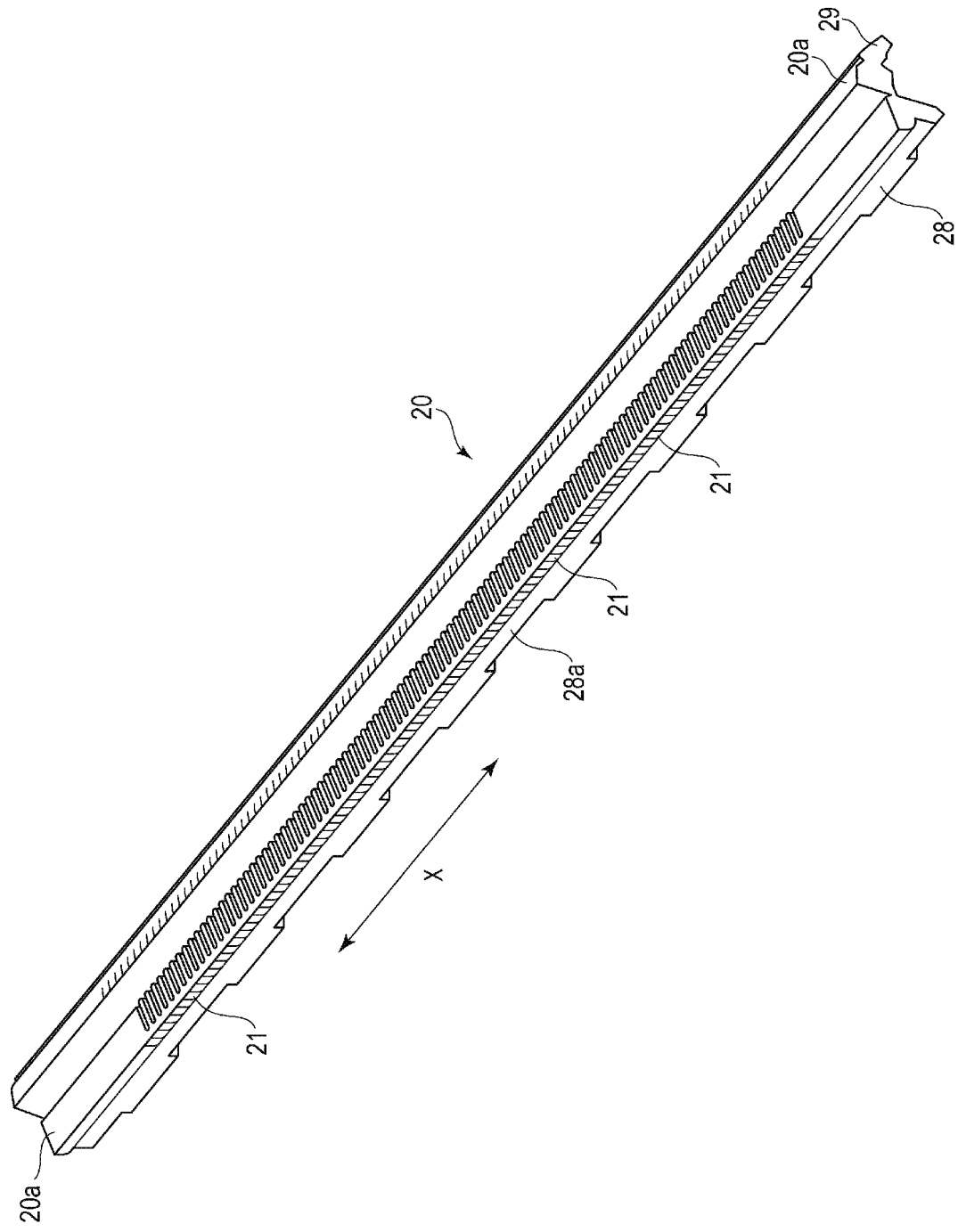
FIG. 3 is an external perspective view illustrating a lens mirror array incorporated in the document reading apparatus of FIG. 2.

The support 11 supports a lens mirror array 20 near the top surface of the support 11 and between the two illumination devices 13 and 14 described above. FIG. 3 is an external perspective view of the lens mirror array 20. The lens mirror array 20 is extended in the Z-direction, and functions to form an erect image of a document on a light receiving surface 15a of an image sensor 15 (e.g., a photoelectric conversion unit) mounted on the substrate 12. The lens mirror array 20 will be described in detail later.

The image sensor 15 is a line sensor in which a plurality of image-capturing elements for converting light into an electrical signal (image signal) is arranged in a line. The image sensor 15 is one or more line sensors. The plurality of image-capturing elements of the image sensor 15 is arranged side by side in the Z-direction. The image sensor 15 is configured by, for example, a charge coupled device (CCD), a complementary metal oxide semiconductor (CMOS), or another image-capturing element.

Further, a light shielding member 16 is attached to the top surface of the support 11. The light shielding member 16 is extended in the Z-direction, and has a slit 17 for passing reflected light from the document surface D1 to be guided to the lens mirror array 20. The light shielding member 16 has a structure in which a long rectangular plate is bent along the longitudinal direction, and a light shielding material is applied to the surface of the light shielding member 16. The slit 17 of the light shielding member 16 functions to prevent light other than reflected light from a predetermined range of the document surface D1 from being incident on the lens mirror array 20.

The support 11 has a slit 18 extending toward the image sensor 15 of the lens mirror array 20 in the Z-direction. The support 11 has a room 11a in which the lens mirror array 20 is accommodated and disposed and a room 11b in which the image sensor 15 is accommodated and disposed, and the slit 18 is provided between the rooms 11a and 11b. The slit 18 has a width that allows reflected light from the document D among light emitted from the lens mirror array 20 to pass through, and shields unnecessary light (noise light) which is a noise component.

For example, when the document D is fed by the ADF 4 in a state (state illustrated in FIGS. 1 and 2) where the document reading device 10 is fixed below the reading glass 5, the document surface D1 is illuminated by the illumination devices 13 and 14 through the reading glass 5. Reflected light from the document surface D1 is incident on the lens mirror array 20 through the slit 17 of the light shielding member 16. The lens mirror array 20 reflects and condenses the reflected light from the document surface D1 as described later, and emits the light toward the image sensor 15 through the slit 18. The image sensor 15 receives the reflected light from the document surface D1, performs photoelectric conversion on the light, and outputs an image signal.

In this case, the erect image, which is formed on the image sensor 15 by the lens mirror array 20, of the document D passing on the reading glass 5 by an operation of the ADF 4 is read line by line along the Z-direction. Then, the document D passes through the reading glass 5 in the X-direction so as make it possible to acquire an entire image of the document surface D1 (for multiple lines). Alternatively, even if the document D is set on the document table glass 3 and the document reading device 10 is moved along the document table glass 3 in the X-direction, similarly, the erect image of the document surface D1 formed on the image sensor 15 by the lens mirror array 20 can be read line by line along the Z-direction to acquire the entire image of the document surface D1.

As illustrated in FIG. 1, the copying machine 100 includes an image forming unit 30 substantially at the center of the casing 2. The image forming unit 30 includes a yellow image forming unit 30Y, a magenta image forming unit 30M, a cyan image forming unit 30C, and a black image forming unit 30K along a traveling direction (X-direction) of an intermediate transfer belt 40. Since the image forming units 30Y, 30M, 30C, and 30K of respective colors have substantially the same structure, the black image forming unit 30K will be representatively described here, and detailed description of the image forming units 30Y, 30M, and 30C of other colors will be omitted.

Figure 4:
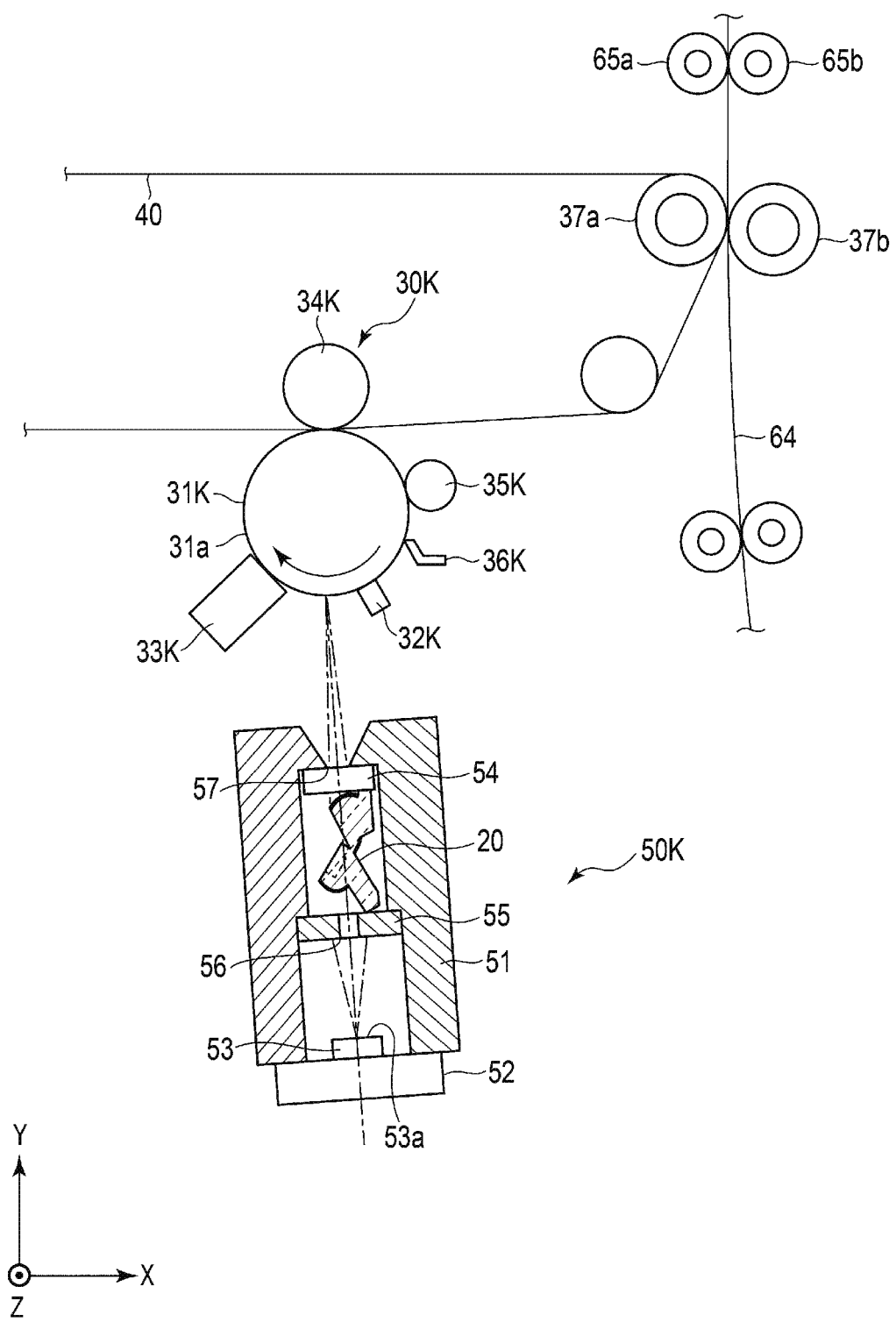
FIG. 4 is a schematic view illustrating an exposure device of an image forming unit incorporated in the copying machine of FIG. 1 and a peripheral structure thereof.

FIG. 4 is a schematic view illustrating the black image forming unit 30K and its peripheral structure in an enlarged manner. The black image forming unit 30K includes, for example, a photoreceptor drum 31K, a charger 32K, an exposure device 50K, a developing device (development device) 33K, a primary transfer roller 34K, a cleaner 35K, and a blade 36K. The exposure device 50K is attached in an orientation slightly inclined with respect to a position facing vertically downward of the photoreceptor drum 31K.

The photoreceptor drum 31K includes a rotating shaft extending in the Z-direction, and is rotatably disposed with an outer circumferential surface thereof in contact with the surface of the intermediate transfer belt 40. The primary transfer roller 34K is provided on the inner side of the intermediate transfer belt 40 facing the photoreceptor drum 31K. The photoreceptor drum 31K is rotated at the same peripheral speed as the intermediate transfer belt 40 in the arrow direction (clockwise direction) by a drive mechanism (not illustrated).

The charger 32K uniformly charges a surface 31a of the photoreceptor drum 31K. The exposure device 50K irradiates the surface 31a of the photoreceptor drum 31K with exposure light based on the black image signal subjected to color separation and forms an electrostatic latent image on the surface 31a of the photoreceptor drum 31K based on the image signal for black. The developing device 33K supplies a black toner to the electrostatic latent image formed on the surface 31a of the photoreceptor drum 31K, and forms a black toner image on the surface 31a of the photoreceptor drum 31K.

The primary transfer roller 34K transfers the black toner image formed on the surface 31a of the photoreceptor drum 31K onto the intermediate transfer belt 40 so as to superimpose toner images of the other colors. The cleaner 35K and the blade 36K remove toner remaining on the surface 31a of the photoreceptor drum 31K. Respective color toner images transferred onto the surface of the intermediate transfer belt 40 in a superimposed manner are fed between a pair of secondary transfer rollers 37a and 37b (which may be collectively referred to as a secondary transfer roller pair 37 in the following description) as the intermediate transfer belt 40 travels.

As illustrated in FIG. 4, the exposure device 50K includes a rectangular block-shaped support 51. The support 51 extends in the Z-direction orthogonal to the paper surface parallel to the rotating shaft of the photoreceptor drum 31K and is provided to face the photoreceptor drum 31K below the photoreceptor drum 31K so as to be separated therefrom.

The support 51 supports the lens mirror array 20 having the same structure as the lens mirror array 20 of the document reading device 10 described above. The lens mirror array 20 of the exposure device 50K is attached to the support 51 in a direction in which the lens mirror array 20 for the document reading device 10 is turned upside down. The lens mirror array 20 is extended in the Z-direction, reflects and condenses light incident from a light source 53 as described later, and emits the light toward the surface 31a of the photoreceptor drum 31K.

The light source 53 has, for example, a plurality of semiconductor light emitting devices (not illustrated) mounted in a line to be arranged side by side in the Z-direction on the surface of a substrate 52. Rows of the semiconductor light emitting elements may be arranged side by side in a plurality of rows along a rotation direction of the photoreceptor drum 31K. That is, the light sources 53 are provided in a form of one or more lines. The lens mirror array 20 will be described in detail later.

The light source 53 emits light based on image data (image signal) for black obtained by performing color separation on image data acquired by the document reading device 10 and image data acquired through an external device such as a personal computer (not illustrated). The plurality of semiconductor light emitting elements of the light source 53 are, for example, LEDs or organic LEDs (OLEDs) that are turned on or off based on image data.

The support 51 supports a transparent protective glass 54 on the photoreceptor drum 31K side of the lens mirror array 20. The protective glass 54 prevents the toner, dust, and the like from adhering to the lens mirror array 20. The protective glass 54 is positioned such that it abuts one end of the lens mirror array 20. The protective glass 54 is extended in the Z-direction.

The support 51 supports a light shielding body 55 on the light source 53 side of the lens mirror array 20. The light shield 55 extends in the Z-direction and has a slit 56 extending in the Z-direction. For example, a light shielding material is applied to the surface of the light shielding body 55. The light shielding body 55 shields part of the light emitted from the light source 53.

Further, the support 51 has a slit 57 extending in the Z-direction on the light emission side of the protective glass 54. The slit 57 has a width that allows a light component necessary for exposure to pass through, and shields noise light unnecessary for exposure.

The light emitted from the light source 53 passes through the slit 56 of the light shield 55 and is incident to the lens mirror array 20. The lens mirror array 20 reflects and condenses the light from the light source 53 and emits the light. The light emitted from the lens mirror array 20 is condensed on the surface 31a of the rotating photoreceptor drum 31K through the protective glass 54 and the slit 57.

In this case, the electrostatic latent image is written line by line on the surface 31a of the photoreceptor drum 31K along the Z-direction by rotation of the photoreceptor drum 31K. Then, when the photoreceptor drum 31K is rotated by a fixed amount, the electrostatic latent image for black subjected to color separation corresponding to the entire image of the document D is formed on the surface 31a of the photoreceptor drum 31K.

As illustrated in FIG. 1, the copying machine 100 includes the secondary transfer roller pair 37 for transferring toner images of respective colors, which are transferred onto the surface of the intermediate transfer belt 40 by being superimposed, onto the paper P. As illustrated in FIG. 4, one secondary transfer roller 37a is disposed at the inner side of the intermediate transfer belt 40, and the intermediate transfer belt 40 is wound around the secondary transfer roller 37a. The other secondary transfer roller 37b is provided to face the secondary transfer roller 37a with the intermediate transfer belt 40 interposed therebetween. The toner images of the respective colors transferred onto the surface of the intermediate transfer belt 40 by being superimposed are fed to the nip between the secondary transfer roller pair 37 as the intermediate transfer belt 40 travels.

A paper feed cassette 61 in which a plurality of papers P of a predetermined size are stacked and accommodated is provided near the lower end in the casing 2 of the copying machine 100. For example, the paper feed cassette 61 is provided so as to be able to be pulled out and housed from the front surface of the casing 2. A pickup roller 62 for picking up the uppermost paper P in the stacking direction among papers P accommodated in paper feed cassette 61 is disposed above the right end of the paper feed cassette 61. The pickup roller 62 brings its circumferential surface into contact with the paper P and rotates to pick up the papers P one by one.

A paper discharge tray 63 is provided at the upper part in the casing 2. The paper discharge tray 63 is disposed below the document table glass 3 and discharges the paper P on which an image is formed into the body of the copying machine 100. A conveyance path 64 for conveying the paper P picked up from the paper feed cassette 61 toward the paper discharge tray 63 in the longitudinal direction is extended between the pickup roller 62 and the paper discharge tray 63. The conveyance path 64 extends through the nip between the transfer roller pair 37, and includes a plurality of conveyance roller pairs 64a and a conveyance guide (not illustrated). A paper discharge roller pair 63a is provided at the end of the conveyance path 64 for discharging the paper P to the paper discharge tray 63. The discharge roller pair 63a can rotate in both forward and reverse directions.

A fixing roller pair 65 is arranged on the conveyance path 64 on the downstream side (upper side in the drawing) of the transfer roller pair 37. The fixing roller pair 65 heats and presses the paper P conveyed through the conveyance path 64 and fixes the toner image transferred onto the surface of the paper P to the surface of the paper P.

As illustrated in FIG. 1, the copying machine 100 has a reverse conveyance path 66 for reversing the paper P on which the image is formed on one side and conveying the paper P to the nip between the transfer roller pair 37. The reverse conveyance path 66 has a plurality of conveyance roller pairs 66a that convey the paper P by nipping and rotating the paper P, and a conveyance guide (not illustrated). A gate 67 for switching a conveyance destination of the paper P between the conveyance path 64 and the reverse conveyance path 66 is provided on the upstream side of the paper discharge roller pair 63a.

When the pickup roller 62 is rotated and the paper P is picked up from the paper feed cassette 61, the paper P is conveyed toward the paper discharge tray 63 through the conveyance path 64 by the plurality of conveyance roller pairs 64a. In this case, the toner images of the respective colors transferred and formed on the surface of the intermediate transfer belt 40 are fed to the nip between the transfer roller pair 37 in accordance with the conveyance timing of the paper P and the toner images of the respective colors are transferred to the surface of the paper P by a transfer voltage applied from the transfer roller pair 37.

The paper P to which the toner image is transferred is heated and pressurized by passing through the fixing roller pair 65, the toner image is melted and pressed against the surface of the paper P, and the toner image is fixed on the paper P. The paper P on which the image is formed in this manner is discharged to the paper discharge tray 63 through the paper discharge roller pair 63a.

In this case, if a both-side mode for forming an image also on the back side of the paper P is selected, the gate 67 is switched to the reverse conveyance path 66 at the timing immediately before the rear end in the discharge direction of the paper P being discharged toward the paper discharge tray 63 comes out of the nip between the paper discharge roller pair 63a, the paper discharge roller pair 63a is reversely rotated, and the paper P is conveyed in a switch-back manner. With this configuration, the rear end of the paper P is directed to the reverse conveyance path 66, and the front and back side of the image forming surface of the sheet is reversed, and the paper P is fed to the nip between the transfer roller pair 37.

Then, toner images based on image data formed on the back side of the paper P is formed on the surface of the intermediate transfer belt 40, and the toner images of respective colors are transferred to the nip between the transfer roller pair 37 as the intermediate transfer belt 40 holding toner images of respective colors in this manner travels. Then, the toner images are transferred and fixed on the back side of the reversed paper P, and is discharged to the paper discharge tray 63 through the paper discharge roller pair 63a.

The copying machine 100 includes a control unit 70 that controls operations of the mechanisms described above. The control unit 70 includes a processor such as a central processing unit (CPU) and a memory. The control unit 70 realizes various processing functions by the processor executing a program stored in the memory. The control unit 70 controls the document reading device 10 to acquire an image from the document D. The control unit 70 controls the image forming unit 30 to form the image on the surface of the paper P. For example, the control unit 70 inputs the image data read by the document reading device 10 to the image forming unit 30. The control unit 70 controls operations of the plurality of conveyance roller pairs 64a and 66a to convey the paper P through the conveyance path 64 and the reverse conveyance path 66.

Figure 5:
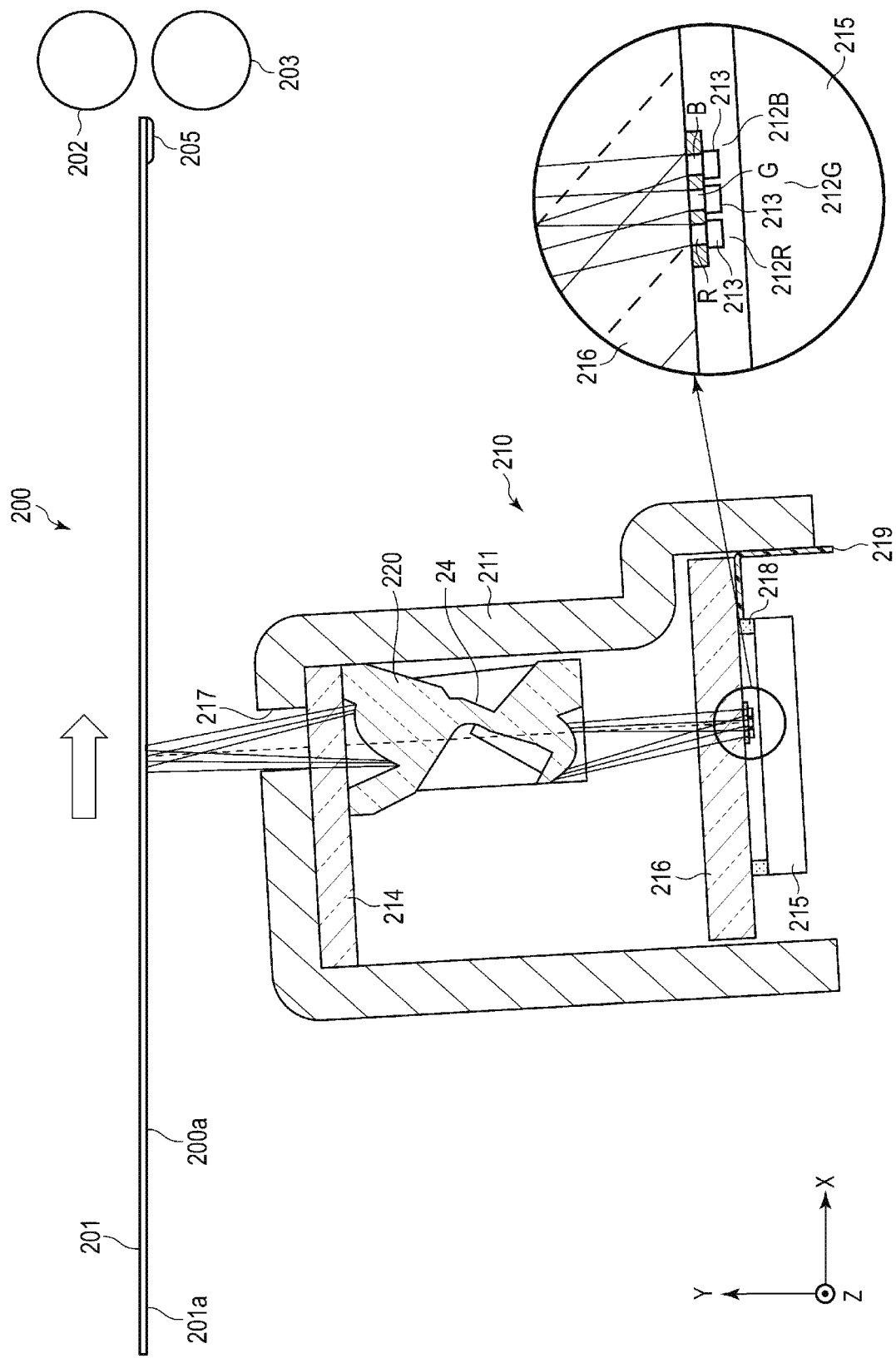
FIG. 5 is a schematic view illustrating a main part of a printer according an embodiment.

FIG. 5 is a schematic view illustrating the main part of a printer 200, which is another embodiment of the image forming apparatus. The printer 200 is, for example, a printer incorporated in an instant camera, a printer for instant photos that develops an image captured by a digital camera, or the like.

The printer 200 includes a conveyance mechanism (not illustrated) for conveying a photosensitive medium 201 (photosensitive material) such as a silver halide photographic film in the direction of the arrow (right direction in FIG. 5, that is, X-direction). The photosensitive medium 201 is conveyed by the conveyance mechanism in a substantially horizontal orientation along a predetermined flat conveyance surface 200a (XZ-plane). The photosensitive medium 201 includes a storage portion 205 which stores developer on the tip end side in the conveyance direction. On the conveyance path of the photosensitive medium 201, a pair of pressing rollers 202 and 203 for sandwiching and pressing the photosensitive medium 201 to unseal the storage portion 205 is provided. The pair of pressure rollers 202 and 203 has a length that exceeds the width in the Z-direction orthogonal to the conveyance direction of the photosensitive medium 201.

The photosensitive medium 201 is conveyed between the pair of pressure rollers 202 and 203. At least one of the pressure rollers 202 and 203 is biased in a direction approaching each other. For that reason, the photosensitive medium 201 conveyed through a space between the pair of pressure rollers 202 and 203 is conveyed while being crushed by the pair of pressure rollers 202 and 203. With this configuration, the storage portion 205 of the photosensitive medium 201 is crushed and unsealed by the pair of pressure rollers 202 and 203, and developer is spread over the entire surface of the photosensitive medium 201 by further conveying the photosensitive medium 201.

Below the conveyance path for conveying the photosensitive medium 201 in the drawing, the exposure device 210 is disposed to face the conveyance path by being spaced apart from the conveyance path. The exposure device 210 irradiates a light receiving surface 201a of the photosensitive medium 201 conveyed through the conveyance path with exposure light of three colors (red-green-blue (RGB)) obtained by performing color separation on image data to form a color latent image on the photosensitive medium 201. The exposure device 210 is disposed upstream of the pair of pressure rollers 202 and 203 along the conveyance path.

The exposure device 210 includes a support 211 extended in a width direction (Z-direction orthogonal to the paper surface) orthogonal to the conveyance direction of the photosensitive medium 201. The support 211 supports a lens mirror array 220 having substantially the same structure as the lens mirror array 20 described above. The lens mirror array 220 is extended in the Z-direction, reflects and condenses light incident from the light sources 212R, 212G, and 212B as described later, and emits the light toward the light receiving surface 201a of the photosensitive medium 201.

The light sources 212R, 212G, and 212B are, for example, OLEDs in which filters and apertures are disposed in a staggered arrangement in two rows for each color with respect to white organic electroluminescence (EL) elements 213. The light sources 212R, 212G, and 212B are arranged in the Z-direction, respectively, and provided separately to be arranged side by side in the X direction. The white organic EL element 213 is attached to a transparent glass 216.

The OLEDs are shielded from the outside air and prevented from absorbing moisture by the transparent glass 216, a sealing plate 215, and an adhesive 218 which is applied to the outer circumference of the sealing plate 215 and provided in a frame shape for sealing a space between the transparent glass 216 and the sealing plate 215. The white organic EL element 213 is connected to a flexible substrate 219, and is supplied with power from a circuit on the flexible substrate 219. The support 211 supports the transparent glass 216 between the lens mirror array 220 and the light sources 212R, 212G, and 212B.

The support 211 supports a transparent protective glass 214 on the photosensitive medium 201 side of the lens mirror array 220. The protective glass 214 protects the lens mirror array 220 and prevents dust from adhering to the lens mirror array 220. The protective glass 214 is positioned to abut one end of the lens mirror array 220.

The support 211 has a slit 217 extending in the Z-direction on the light emission side of the protective glass 214. The slit 217 has a width that allows light components necessary for exposure to pass through, and shields noise light unnecessary for exposure. The support 211 (that is, the transparent glass 216) is provided or oriented to be inclined with respect to the conveyance surface 200a of the photosensitive medium 201.

When the photosensitive medium 201 is conveyed by the conveyance mechanism and the light receiving surface 201a of the photosensitive medium 201 is irradiated with light from the light sources 212R, 212G and 212B through the lens mirror array 220, a color latent image is formed on the photosensitive medium 201. When the photosensitive medium 201 is further conveyed, the photosensitive medium 201 is crushed by the pair of pressure rollers 202 and 203, the storage portion 205 of the photosensitive medium 201 is unsealed, and developer is supplied to the photosensitive medium 201. With this configuration, the color latent image of the photosensitive medium 201 is developed to form a color image on the photosensitive medium 201.

Figure 6:
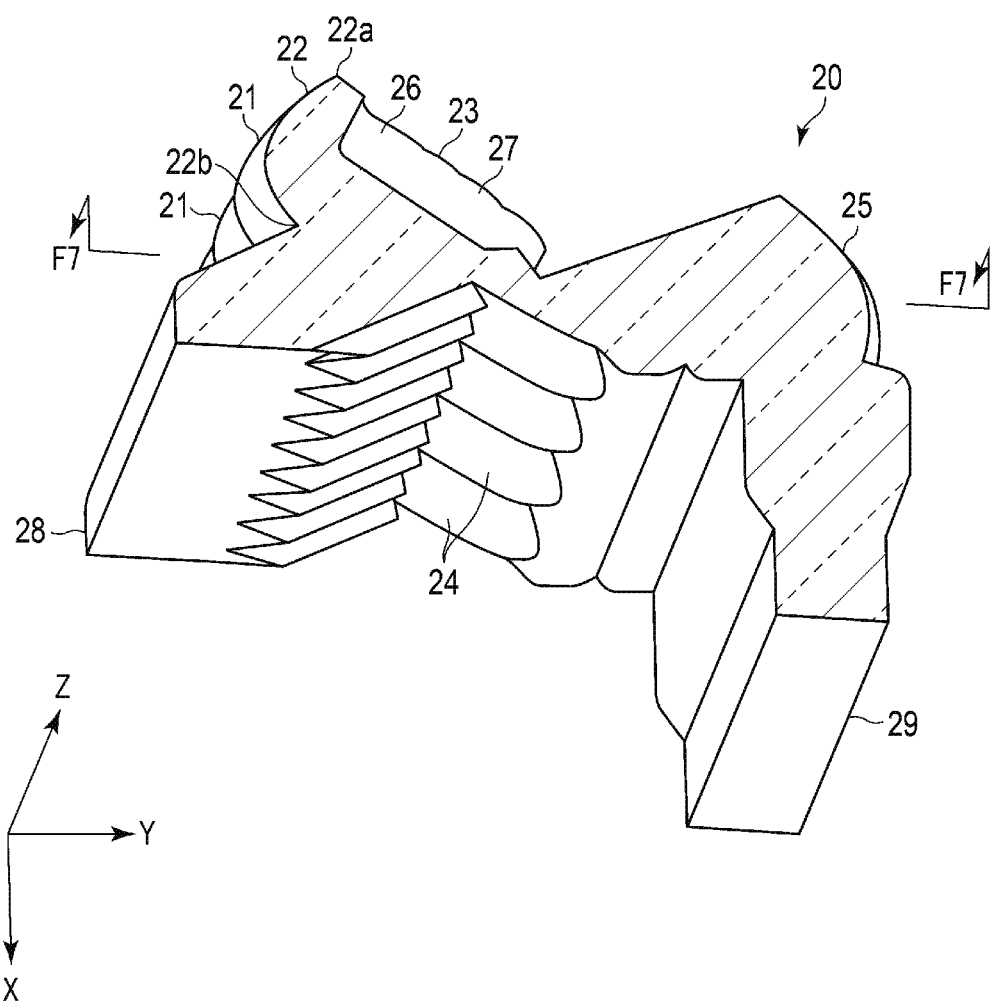
FIG. 6 is an external perspective view illustrating a part of the lens mirror array of FIG. 3 in a partially enlarged manner.

Hereinafter, the lens mirror array 20 described above will be described with reference to FIGS. 3, 6 and 7. FIG. 3 is an external perspective view of the lens mirror array 20. FIG. 6 is a partially enlarged perspective view of the lens mirror array 20. FIG. 7 is a cross-sectional view of the lens mirror array 20 taken along the XY plane passing through the center of one optical element 21 of the lens mirror array 20 in the Z-direction and orthogonal to the longitudinal direction of the lens mirror array 20. FIG. 7 illustrates a light path of light passing through the lens mirror array 20. Since the lens mirror array 220 of the other embodiment described above has substantially the same structure as the lens mirror array 20 described here, the lens mirror array 20 will be representatively described here, and the description of the lens mirror array 220 will be omitted.

The lens mirror array 20 is incorporated in each of the document reading device 10 and the exposure devices 50Y, 50M, 50C, and 50K of the copying machine 100 in an orientation in which the longitudinal direction of the lens mirror array 20 is along the Z-direction. The lens mirror array 20 has a structure in which a plurality of transparent optical elements 21 (only four transparent optical elements are illustrated in FIG. 6) having substantially the same shape are arranged side by side in the Z-direction and integrated. In addition to the plurality of optical elements 21, the lens mirror array 20 has extensions 20a at both ends in the longitudinal direction for the operator to hold the lens mirror array 20 with his or her fingers. In this embodiment, the lens mirror array 20 is formed by integral molding of transparent resin. The lens mirror array 20 may be formed of other transparent materials such as glass.

Each optical element 21 of the lens mirror array 20 guides diffused light from an object point O to be focused onto an image point F as illustrated in FIG. 7. When the lens mirror array 20 is attached to the document reading device 10 illustrated in FIG. 2, the object point O is present on the document surface D1 and the image point F is present on the light receiving surface 15a of the image sensor 15. When the lens mirror array 20 is attached to the exposure device 50Y (50M, 50C, and 50K) illustrated in FIG. 4, the object point O is present on a light emitting surface 53a of the light source 53, and the image point F is present on the surface 31a of the photoreceptor drum 31K (31M, 31C, and 31K). In the following description, the surface 31a of the photoreceptor drum 31K (31M, 31C, 31K) is a flat surface that passes through the image point F and is in contact with the outer circumferential surface (strictly speaking, the charge generation layer) of the photoreceptor drum 31K.

Light from a plurality of object points O on the document surface D1 and the light emitting surface 53a (hereinafter collectively referred to as a light emitting surface OP) is incident on one optical element 21. That is, the optical element 21 guides light incident from the object points O within a predetermined range of the document surface D1 and the light emitting surface 53a and emits the light. For example, one optical element 21 guides light from object points O disposed within a width two to three times a pitch of the optical element 21 in the Z-direction and emits the light. Each of the optical elements 21 of the lens mirror array 20 reflects the incident light twice and emits the light to form an erect image of the object point O at the image point F.

For example, if the lens mirror array 20 is incorporated into the document reading device 10 illustrated in FIG. 2, the plurality of optical elements 21 form an image of the reflected light from the document surface D1 on the light receiving surface 15a of the image sensor 15. If the lens mirror array 20 is incorporated into the exposure device 50K illustrated in FIG. 4, the plurality of optical elements 21 form the image of the light from the light emitting surface 53a on the surface 31a of the photoreceptor drum 31K. In this case, the light receiving surface 15a of the image sensor 15 and the surface 31a of the photoreceptor drum 31K function as an image plane FP. Hereinafter, the structure and function of each optical element 21 will be described by taking the case where the lens mirror array 20 is incorporated into the exposure device 50K as an example.

As illustrated in FIGS. 6 and 7, the optical element 21 has, on its surface, an incident-side lens surface 22 (incident surface), an upstream-side reflecting surface 23 (reflecting surface), a downstream-side reflecting surface 24 (reflecting surface), and an emission-side lens surface 25 (emission surface). The incident-side lens surface 22, the downstream-side reflecting surface 24, and the emission-side lens surface 25 are surfaces which are curved so as to be convex outward. The upstream-side reflecting surface 23 is a flat surface parallel to the Z-direction. A ridge portion 22a extending substantially in the longitudinal direction (Z-direction) of the lens mirror array 20 is provided between the incident-side lens surface 22 and the upstream-side reflecting surface 23. An imaginary interface (cross-section in FIG. 6) between two optical elements 21 adjacent to each other in the Z-direction is substantially orthogonal to the surfaces 22, 23, 24, and 25 described above.

The respective surfaces 22, 23, 24, and 25 of the optical element 21 are surfaces substantially along the longitudinal direction of the lens mirror array 20. That is, the surfaces 22, 23, 24, and 25 of the optical elements 21 are respectively continuous surfaces connected in the longitudinal direction in the lens mirror array 20 in which the plurality of optical elements 21 are integrally connected in the longitudinal direction. The lens mirror array 20 is attached in an orientation in which the incident-side lens surfaces 22 of the plurality of optical elements 21 face the light emitting surface 53a of the light source 53.

As illustrated in FIG. 7, when paying attention to one optical element 21, diffused light from the light emitting surface 53a placed at the object point O is incident on the incident-side lens surface 22. The incident-side lens surface 22 converges the incident diffused light and forms an intermediate inverted image. The upstream-side reflecting surface 23 is continuous with the incident-side lens surface 22 through the ridge portion 22a and reflects light incident through the incident-side lens surface 22 toward the downstream-side reflecting surface 24 by total reflection or Fresnel reflection.

In order to efficiently take the light from the light emitting surface 53a into the optical element 21, it is desirable to dispose the optical element 21 in such a direction that a perpendicular passing through the center of the light emitting surface 53a passes through the center of the incident-side lens surface 22. That is, since the light emitted from the light emitting surface 53a has a Lambertian light distribution, it is desirable that light with the highest radiation intensity (light emitted in the vertical direction from the center of the light emitting surface 53a) is incident on the center of the incident-side lens surface 22.

The downstream-side reflecting surface 24 further reflects the light reflected by the upstream-side reflecting surface 23 toward the emission-side lens surface 25 by total reflection or Fresnel reflection. The downstream-side reflecting surface 24 has a power for making the incident-side lens surface 22 and the emission-side lens surface 25 conjugate, and functions as a relay lens for making the incident-side lens surface 22 and the emission-side lens surface 25 conjugate.

The emission-side lens surface 25 emits the light reflected by the downstream-side reflecting surface 24 toward the surface 31a of the photoreceptor drum 31K disposed at the image point F. The emission-side lens surface 25 is combined with the downstream-side reflecting surface 24 to form an erect image, which is an inverted image of the intermediate inverted image formed by the incidence side lens surface 22, on the surface 31a. An image of light emitted from the emission-side lens surface 25 is formed on the surface 31a of the photoreceptor drum 31K disposed at the image point F.

A light shielding material 26 (see FIG. 6) is applied to a part of the surface of the optical element 21. The light shielding material 26 is applied to the surface of the optical element 21 by a dispenser, an inkjet head, or the like. The light shielding material 26 is, for example, a highly light-shielding ink (for example, a UV ink containing a light shielding material such as carbon black, pigment, dye, or the like) based on a polymer having a refractive index substantially the same as that of the lens mirror array 20. The light shielding member 26 prevents the light transmitted through the lens mirror array 20 from being reflected and emitted out of the lens mirror array 20.

In the upstream-side reflecting surfaces 23 of the plurality of optical elements 21 adjacent to each other in the longitudinal direction of the lens mirror array 20, the end portions on the sides of the ridge portions 22a close to the incident-side lens surfaces 22 are flush with each other. In other words, between the upstream-side reflecting surfaces 23 of the plurality of optical elements 21, tooth-shaped grooves 27 which divide the reflecting surfaces are provided. The grooves 27 are formed to surround end portions of the plurality of upstream-side reflecting surfaces 23 separated from the incident-side lens surfaces 22 and define one ends of the emission-side lens surfaces 25. The groove 27 is provided around the upstream-side reflecting surface 23 except the ridge portion 22a.

The light shielding material 26 is applied to the entire surface of the tooth-shaped groove 27. The light shielding material 26 is injected into the groove 27 by, for example, a dispenser, and is applied to the inner surface of the groove 27 by the capillary phenomenon of the groove 27 or wet expansion of the light shielding material. As described above, when the light shielding material 26 is applied to the inner surface of the groove 27 by utilizing the capillary phenomenon, the wet expansion, and the like, an appropriate amount of the light shielding material 26 can be continuously applied quickly, and the operation can be simplified, and the light shielding material 26 can be uniformly applied to each optical element 21. In other words, in this embodiment, the light shielding material 26 is not applied to the surface (in particular, the upstream-side reflecting surface 23) of the lens mirror array 20 other than the grooves 27.

The lens mirror array 20 also includes two flange portions 28 and 29 over the entire length thereof. Both longitudinal ends of the flange portion 28 and 29 are included in the extensions 20a described above. As illustrated in FIG. 6, the flange portion 28 (protruding portion) on the incident side is provided between the incident-side lens surfaces 22 and the downstream-side reflecting surfaces 24 of the plurality of optical elements 21. The flange portion 28 on the incident side protrudes outward from between the plurality of incident-side lens surfaces 22 continuous in the Z-direction and the plurality of downstream-side reflecting surfaces 24 continuous in the Z-direction. The flange portion 29 on the light emission side is provided between the downstream-side reflecting surfaces 24 and the light emission-side lens surfaces 25 of the plurality of optical elements 21. The flange portion 29 on the emission side protrudes outward from between the plurality of downstream-side reflecting surfaces 24 continuous in the Z-direction and the plurality of emission-side lens surfaces 25 continuous in the Z-direction. The flange portions 28 and 29 are provided for positioning and attaching the lens mirror array 20.

Figure 8:
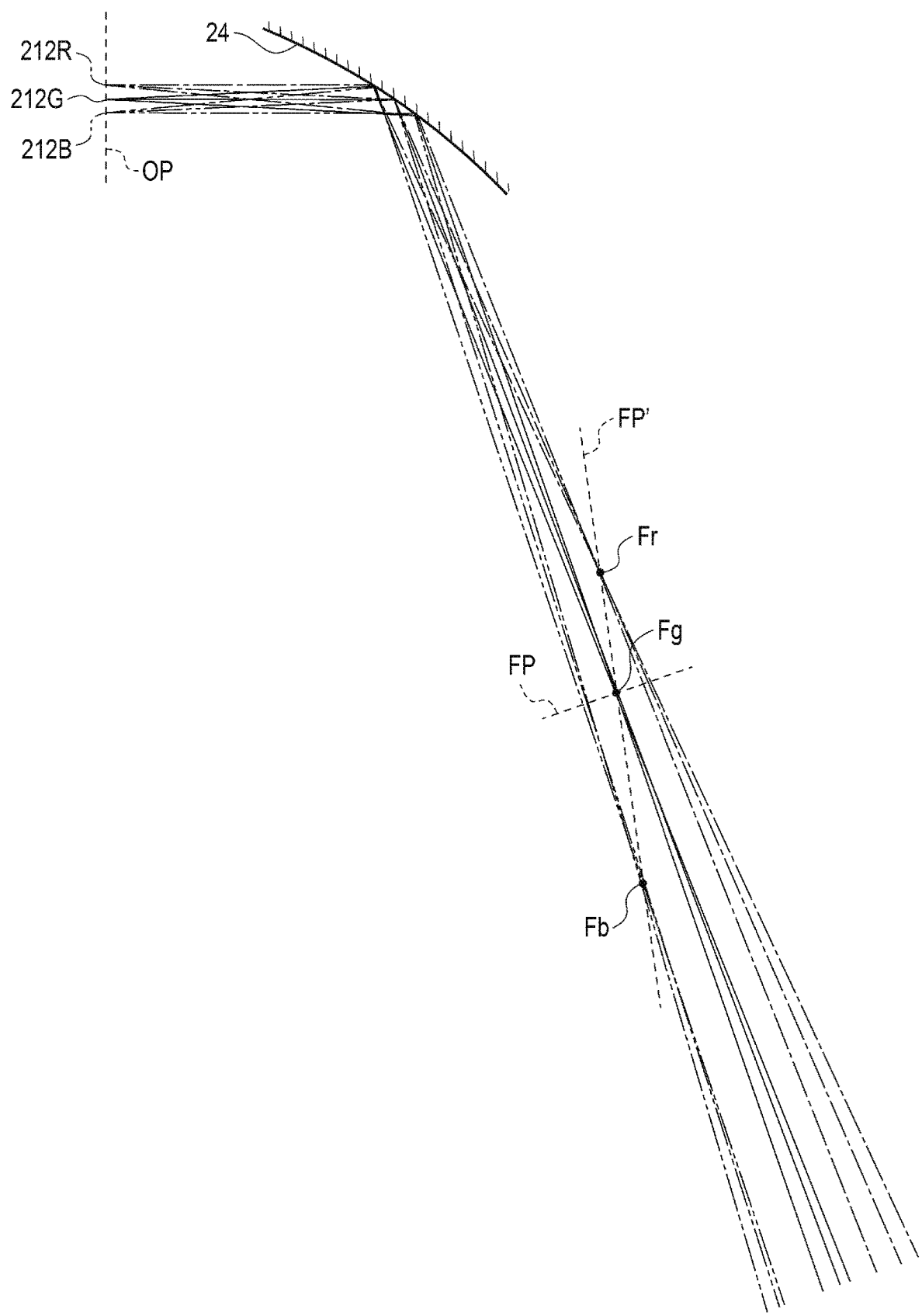
FIG. 8 is a light beam diagram for explaining reflection characteristics of light by a downstream-side reflecting surface of a lens mirror array incorporated in the printer of FIG. 5.

FIG. 8 is a light beam diagram for explaining reflection characteristics of light by the downstream-side reflecting surface 24 of the optical element 21 described above. Here, in order to make the description easy to understand, the reflection characteristics of light by the downstream-side reflecting surface 24 of one optical element 21 of the lens mirror array 220 incorporated in the exposure device 210 of the printer 200 of FIG. 5 will be described. In FIG. 8, the optical path of light guided through the optical element 21 of the actual lens mirror array 220 is simplified and illustrated. Here, the light sources 212R, 212G, and 212B of respective colors are described as being point light sources.

Diffused light from the light sources 212R, 212G, and 212B incident on the downstream-side reflecting surface 24 having a power that makes the object point O and the image point F conjugate is reflected by the downstream-side reflecting surface 24 and converged toward image points Fr, Fg, and Fb of the respective diffused light. As described above, the light sources 212R, 212G, and 212B are arranged side by side separately in the X-direction. Furthermore, light from the light sources 212R, 212G, and 212B is incident from a direction inclined with respect to the downstream reflecting surface 24 in the X-direction.

In this case, for example, assuming that an image plane FP including the green light image point Fg from the light source 212G disposed at the center in the X-direction is parallel to the light emitting surface OP of the light sources 212R, 212G, and 212B, the image points Fr and Fb of light of other colors are not formed in the plane FP orthogonal to the principal light beams emitted from the light source 212G. Specifically, an image of red light emitted from the light source 212R is formed on a position in front of the plane FP, and blue light emitted from the light source 212B is focused at a position beyond the plane FP. In other words, a plane FP' including the image points Fr, Fg, and Fb on which the image of the light of each color is formed is a plane that is not parallel to the plane orthogonal to the principal rays emitted from the light emitting plane OP. In the case of this embodiment, the light beam is reflected once by the upstream side reflecting surface 23 so that the principal light beams on the incident side and the emission side become substantially parallel and thus, in the conventional way of thinking that the light emitting surface and the image surface are respectively orthogonal to the principal light beams, the light emitting surface OP and the image plane FP are parallel, but the light emitting surface OP and the image surface FP' are not parallel. More specifically, light of each color can be substantially focused at the image plane FP' by inclining the light emitting surface OP and the image surface FP' relative to each other in a direction in which the imaginary plane (first plane) parallel to the light emitting surface OP and the imaginary plane (second plane) parallel to the image plane FP' intersect at the downstream-side reflecting surface 24 side.

From another point of view, if the lens mirror array 220 described above is used, an effective width of light, which is capable of being focused on the image plane FP', in a direction intersecting the optical axis among the light incident through the incident-side lens surface 22 of the optical element 21, can be expanded, compared to the case where the light emitting surface OP and the image plane FP' are disposed in parallel by inclining the image plane FP' in the direction described above with respect to the light emitting surface OP.

For that reason, according to this embodiment, the light emitting surface OP and the image plane FP' are inclined relative to each other with respect to the direction described above and are disposed nonparallel to each other, thereby capable of expanding spacing between the light sources 212R, 212G, and 212B in the X-direction and increasing the degree of freedom in the layout of the light sources 212R, 212G, and 212B. According to this embodiment, since the effective width of the incident light can be expanded, positioning accuracy of the lens mirror array 220 along the X-direction can be lowered, and positioning adjustment along the X-direction of the lens mirror array 220 can be made rough.

Further, according to this embodiment, it is possible to obtain a good beam diameter in a relatively wide width range in the X-direction on the image plane FP'. For that reason, the position adjustment in the X-direction of the constitutional elements disposed on the image plane FP' can be made rough, and the degree of freedom in the layout of constitutional elements on the image plane FP' side can be increased.

In addition, since the light sources 212R, 212G, and 212B achieve a Lambertian light distribution, the light sources 212R, 212G, and 212B emit light whose radiation intensity becomes maximum in the direction orthogonal to the light emitting surface OP. For that reason, it is desirable to set the light emitting surface OP to an angle at which the maximum power can be imaged on the image plane FP' in consideration of the radiation angle distribution of the light sources 212R, 212G, and 212B. In this case, it is desirable that the image plane FP' is disposed at an angle at which the effective width of incident light in the X-direction is as wide as possible after the light emitting surface OP is disposed at the angle described above.

As a result of optimization design, it is found that an angle of the light emitting surface OP for imaging the maximum power on the image plane FP' is an angle which is inclined in a direction in which the tangent plane at the design center of the light emitting surface OP and a plane obtained by extending the tangent plane at the design center in the image plane FP' intersect at the downstream-side reflecting surface 24 side from an angle connecting the object point O when the image height is 0 and the image point F at that time and is obtained when the perpendicular from the object height 0 has a shape passing through the center of the incident-side lens surface 22.

For that reason, for example, if the lens mirror array 20 of this embodiment is incorporated into the document reading device 10 of the copying machine 100 as illustrated in FIG. 2, it is desirable that the lens mirror array 20 is positioned and disposed so that a perpendicular passing through the object point O of the document surface D1 passes through the center of the incident-side lens surface 22 of the optical element 21 of the lens mirror array 20 and the document surface D1 and the light receiving surface 15a are relatively inclined so that the imaginary first plane parallel to the document surface D1 and the imaginary second plane parallel to the light receiving surface 15a of the image sensor 15 intersect on the downstream-side reflecting surface 24 side of the optical element 21.

In this case, the effective width of incident light which can be guided by the lens mirror array 20 and of which image can be formed on the light receiving surface 15a of the image sensor 15 in the X-direction can be expanded and the positioning adjustment of the lens mirror array 20 in the X-direction can be made rough. In this case, a width of a spot to be formed on the light receiving surface 15a of the image sensor 15 can be expanded and deterioration of the optical characteristics in the X-direction can be alleviated.

Also, for example, if the lens mirror array 20 of this embodiment is incorporated into the exposure device 50K (50Y, 50M, and 50C) as illustrated in FIG. 4, it is desirable that the lens mirror array 20 is positioned and disposed so that a perpendicular passing through the object point O on the light emitting surface 53a of the light source 53 passes through the center of the incident-side lens surface 22 of the optical element 21 of the lens mirror array 20 and the light emitting surface 53a and the surface 31a are relatively inclined so that the imaginary first plane parallel to the light emitting surface 53a and the imaginary second plane parallel to the tangent plane at the position where the light beams of the surface 31a of the photoreceptor drum 31K intersect on the downstream-side reflecting surface 24 side of the optical element 21.

In this case, the effective width of incident light which can be guided by the lens mirror array 20 and of which image can be formed on the surface 31a of the photoreceptor drum 31K, in the X-direction can be expanded and the positioning adjustment of the lens mirror array 20 in the X-direction can be made rough. In this case, a width of a spot to be formed on the surface 31a of the photoreceptor drum 31K can be expanded, and deterioration of the optical characteristics in the X-direction can be alleviated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the embodiments described above, the case where the lens mirror array 20 is positioned so that the perpendicular at which irradiation intensity of light emitted from the light emitting surface OP including the object point O is maximum passes through the center of the incident-side lens surface 22 of the lens mirror array 20 is described, but is not limited thereto. The lens mirror array 20 may be disposed so that the perpendicular of the light emitting surface OP passes through a position slightly deviated from the center of the incident-side lens surface 22. That is, the light emitting surface OP and the image plane FP may be relatively inclined in the direction described above.

In the embodiment described above, the case where light is guided in the direction in which the light incident from the incident-side lens surface 22 of the lens mirror array 20 is emitted through the emission-side lens surface 25 is described, but is not limited thereto. It is also possible to guide light in the direction in which the light incident from the emission-side lens surface 25 is emitted through the incident-side lens surface 22. In this case, similarly, it is desirable that the light emitting surface OP and the image plane FP are relatively inclined in the direction in which the light emitting surface OP including the object point O and the image plane FP including the image point F intersect on the downstream-side reflecting surface 24 side.

What is claimed is:

1. An optical device comprising:
   a light emitting surface;
   a lens mirror array in which a plurality of optical elements are arranged, each of the plurality of optical elements having:
      an incident surface that transmits light from the light emitting surface and converges the light;
      an emission surface that emits the light incident through the incident surface; and
      a plurality of reflecting surfaces that reflect the light incident through the incident surface toward the emission surface; and
   an image plane where an image of the light emitted through the emission surface is formed;
   wherein:
      the light emitting surface and the image plane are disposed nonparallel to each other so that an imaginary first plane parallel to the light emitting surface and an imaginary second plane parallel to a tangent plane of the image plane intersect at a side of the plurality of reflecting surfaces;
      one of the plurality of reflecting surfaces has a power that brings an object point on the light emitting surface and an image point on the image plane closer to a conjugate; and
      the imaginary first plane and the imaginary second plane intersect at the side of the one of the plurality of reflecting surfaces having the power.

2. The optical device of claim 1, wherein the plurality of reflecting surfaces include:
   an upstream-side reflecting surface that reflects the light transmitted through the incident surface; and
   a downstream-side reflecting surface that reflects the light reflected by the upstream-side reflecting surface toward the emission surface.

3. The optical device of claim 2, wherein the one of the plurality of reflecting surfaces having the power is the downstream-side reflecting surface.

4. The optical device of claim 2, wherein the upstream-side reflecting surface is flat, and wherein the incident surface, the emission surface, and the downstream-side reflecting surface are curved.

5. The optical device of claim 1, wherein each of the plurality of optical elements is disposed so that a perpendicular passing through a center of the light emitting surface passes through a center of the incident surface.

6. The optical device of claim 1, further comprising a support having a first end and an opposing second end, wherein the lens mirror array is disposed within an interior of the support between the first end and the opposing second end.

7. The optical device of claim 6, further comprising a substrate positioned at and enclosing the first end of the support.

8. The optical device of claim 7, further comprising a light source disposed along the substrate such that the substrate defines the light emitting surface.

9. The optical device of claim 8, wherein the light source is disposed along an interior surface of the substrate.

10. The optical device of claim 8, wherein the light source is disposed along an exterior surface of the substrate, and wherein the substrate is transparent.

11. The optical device of claim 10, further comprising a sealing plate coupled to the exterior surface of the substrate and enclosing the light source between the substrate and the sealing plate.

12. The optical device of claim 7, further comprising an image sensor disposed along the substrate such that the substrate defines the image plane.

13. The optical device of claim 7, wherein the opposing second end of the support defines an opening that allows the light from the light emitting surface to pass therethrough out of the interior of the support to the image plane.

14. The optical device of claim 13, further comprising a transparent substrate positioned to enclose the opening.

15. The optical device of claim 7, further comprising a shielding member extending from the opposing second end of the support, wherein the shielding member defines an opening that allows the light from the light emitting surface to pass therethrough into the interior of the support to the image plane.

16. A scanner comprising:
an illumination device that illuminates a document surface serving as a light emitting surface;
a lens mirror array that guides reflected light from the document surface, the lens mirror array including:
an incident surface that transmits the light from the light emitting surface and converges the light;
an emission surface that emits the light incident through the incident surface; and
a plurality of reflecting surfaces that reflect the light incident through the incident surface toward the emission surface; and
a photoelectric conversion unit that receives the light from the document surface guided through the lens mirror array and outputs an image signal;
wherein;
a light receiving surface of the photoelectric conversion unit is disposed nonparallel to the document surface so that an imaginary first plane parallel to the document surface and an imaginary second plane parallel to the light receiving surface intersect to a side of the lens mirror array;
one of the plurality of reflecting surfaces has a power that brings an object point on the light emitting surface and an image point on the photoelectric conversion unit closer to a conjugate; and
the imaginary first plane and the imaginary second plane intersect at the side of the one of the plurality of reflecting surfaces having the power.

17. The scanner of claim 16, wherein the plurality of reflecting surfaces include (i) an upstream-side reflecting surface that reflects the light transmitted through the incident surface and (ii) a downstream-side reflecting surface that reflects the light reflected by the upstream-side reflecting surface toward the emission surface, and wherein the one of the plurality of reflecting surfaces having the power is the downstream-side reflecting surface.

18. An image forming apparatus comprising:
a light source having a light emitting surface for emitting light based on an image signal;
a lens mirror array that guides the light from the light emitting surface, the lens mirror array including:
an incident surface that transmits the light from the light emitting surface and converges the light;
an emission surface that emits the light incident through the incident surface; and
a plurality of reflecting surfaces that reflect the light incident through the incident surface toward the emission surface;
a photoreceptor drum having a surface serving as an image plane on which the light based on the image signal guided through the lens mirror array is received and an electrostatic latent image is formed; and
a developing device that supplies developer to the electrostatic latent image formed on the surface of the photoreceptor drum and develops the electrostatic latent image;
wherein:
the surface of the photoreceptor drum is disposed to be inclined with respect to the light emitting surface so that an imaginary first plane parallel to the light emitting surface of the light source and an imaginary second plane contacting the surface of the photoreceptor drum at a position where the light is received based on the image signal intersect to a side of the lens mirror array;
one of the plurality of reflecting surfaces has a power that brings an object point on the light emitting surface and an image point on the image plane closer to a conjugate; and
the imaginary first plane and the imaginary second plane intersect at the side of the one of the plurality of reflecting surfaces having the power.

19. The image forming apparatus of claim 18, wherein the plurality of reflecting surfaces include (i) an upstream-side reflecting surface that reflects the light transmitted through the incident surface and (ii) a downstream-side reflecting surface that reflects the light reflected by the upstream-side reflecting surface toward the emission surface, and wherein the one of the plurality of reflecting surfaces having the power is the downstream-side reflecting surface.

20. An image forming apparatus comprising:
a light source having a light emitting surface for emitting light based on an image signal; and
a lens mirror array that guides the light from the light emitting surface, the lens mirror array including:
an incident surface that transmits the light from the light emitting surface and converges the light;
an emission surface that emits the light incident through the incident surface; and
a plurality of reflecting surfaces that reflect the light incident through the incident surface toward the emission surface;
wherein:
an image is formed by irradiating a light receiving surface of a photosensitive material with the light based on the image signal guided through the lens mirror array;
the light emitting surface and the light receiving surface of the photosensitive material are disposed nonparallel to each other so that an imaginary first plane parallel to the light emitting surface of the light source and an imaginary second plane parallel to the light receiving surface of the photosensitive material for receiving the light based on the image signal intersect to a side of the lens mirror array;
one of the plurality of reflecting surfaces has a power that brings an object point on the light emitting surface and an image point on the light receiving surface closer to a conjugate; and the imaginary first plane and the imaginary second plane intersect at the side of the one of the plurality of reflecting surfaces having the power.

* * * * *